US011551065B2

(12) United States Patent
Martin

(10) Patent No.: US 11,551,065 B2
(45) Date of Patent: *Jan. 10, 2023

(54) NEURAL NETWORK ARCHITECTURE USING CONTROL LOGIC DETERMINING CONVOLUTION OPERATION SEQUENCE

(71) Applicant: Imagination Technologies Limited, Kings Langley (GB)

(72) Inventor: Christopher Martin, Leighton Buzzard (GB)

(73) Assignee: Imagination Technologies Limited, Kings Langley (GB)

( * ) Notice: Subject to any disclaimer, the term of this patent is extended or adjusted under 35 U.S.C. 154(b) by 1101 days.

This patent is subject to a terminal disclaimer.

(21) Appl. No.: 16/182,369

(22) Filed: Nov. 6, 2018

(65) Prior Publication Data

US 2019/0147325 A1    May 16, 2019

(30) Foreign Application Priority Data

Nov. 6, 2017  (GB) ..................................... 1718358
Nov. 6, 2017  (GB) ..................................... 1718359

(51) Int. Cl.
*G06N 3/063*  (2006.01)
*G06F 7/544*  (2006.01)
(Continued)

(52) U.S. Cl.
CPC .......... *G06N 3/063* (2013.01); *G06F 7/5443* (2013.01); *G06F 17/15* (2013.01); *G06N 3/04* (2013.01);
(Continued)

(58) Field of Classification Search
CPC ........ G06N 3/063; G06N 3/04; G06N 3/0481; G06N 3/0454; G06F 7/5443; G06F 17/15
See application file for complete search history.

(56) References Cited

U.S. PATENT DOCUMENTS 10,846,201 B1 *  11/2020  Diamant ............. G06F 11/3636
2016/0358069 A1   12/2016  Brothers et al.
(Continued)

FOREIGN PATENT DOCUMENTS

GB    2552243 A    1/2018
GB    2554711 A    4/2018
WO    2017/124646 A1    7/2017

OTHER PUBLICATIONS

Han et al; "EIE: Efficient Inference Engine on Compressed Deep Neural Network"; 2016 ACM/IEEE 43rd Annual International Symposium on Computer Architecture; vol. 44; No. 3; Jun. 18, 2016; pp. 243-254.

(Continued)

*Primary Examiner* — Ajay Ojha
(74) *Attorney, Agent, or Firm* — Potomac Law Group, PLLC; Vincent M DeLuca

(57) ABSTRACT

Hardware for implementing a Deep Neural Network (DNN) having a convolution layer, the hardware comprising a plurality of convolution engines each operable to perform a convolution operation by applying a filter to a data window, each filter comprising a set of weights for combination with respective data values of a data window, and each of the plurality of convolution engines comprising: multiplication logic operable to combine a weight of a filter with a respective data value of a data window; control logic configured to: receive configuration information identifying a set of filters for operation on a set of data windows at the plurality of convolution engines; determine, using the configuration information, a sequence of convolution operations for evaluation at the multiplication logic; in accordance with the determined sequence of convolution operations, request weights and data values for at least partially applying a filter to a data window; and cause the multiplication logic to combine the weights with their respective data values; and (Continued)

accumulation logic configured to accumulate the results of a plurality of combinations performed by the multiplication logic so as to form an output for a convolution operation of the determined sequence.

20 Claims, 7 Drawing Sheets

(51) Int. Cl.
*G06F 17/15* (2006.01)
*G06N 3/04* (2006.01)

(52) U.S. Cl.
CPC ......... *G06N 3/0481* (2013.01); *G06N 3/0454* (2013.01)

(56) References Cited

U.S. PATENT DOCUMENTS

2017/0316312 A1    11/2017  Goyal et al.
2018/0157961 A1*   6/2018   Henry .................... G06N 3/04

OTHER PUBLICATIONS

Parashar et al; "SCNN: An Accelerator for Compressed-sparse Convolutional Neural Networks"; Retrieved from the Internet: URL:https://arxiv.org/pdf/1708.04485.pdf; May 23, 2017; pp. 1-12.
Zhang et al; "Cambricon-X: An Accelerator for Sparse Neural Networks"; 2016 49th Annual IEEE/ACM International Symposium on Microarchitecture (MICRO) IEEE; Oct. 15, 2016; pp. 1-12.

* cited by examiner

NEURAL NETWORK ARCHITECTURE USING CONTROL LOGIC DETERMINING CONVOLUTION OPERATION SEQUENCE

BACKGROUND

The present disclosure relates to hardware for implementing a Deep Neural Network having a convolution layer, and to methods for implementing in hardware a Deep Neural Network having a convolution layer.

Deep Neural Networks (CNNs) are a type of artificial neural network having multiple layers between the input and output layers. DNNs can be used for machine learning applications. In particular, a deep neural network can be used in signal processing applications, including image processing and computer vision applications.

DNNs have typically been implemented in applications where power resources are not a significant factor. Despite this, DNNs have application in a number of different technical fields in which the resources of the hardware used to implement the DNNs are such that power consumption, processing capabilities, or silicon area are limited. Furthermore, the definition of a DNN for a particular application may vary over time—for example, as a result of additional training of the DNN.

DNNs often include a convolution layer at which filters are applied to windows of a dataset. In particular, Convolutional Neural Networks (CNNs) are a class of DNNs that include one or more convolution layers and are often applied to analysing image data. Depending on the application, the number of filters and windows at a convolution layer can vary enormously between different DNNs.

There is a need for a system for efficiently performing convolution operations in a DNN in a flexible and scalable manner over wide range of different DNN architectures.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided Hardware for implementing a Deep Neural Network (DNN) having a convolution layer, the hardware comprising a plurality of convolution engines each operable to perform a convolution operation by applying a filter to a data window, each filter comprising a set of weights for combination with respective data values of a data window, and each of the plurality of convolution engines comprising:
  multiplication logic operable to combine a weight of a filter with a respective data value of a data window;
  control logic configured to:
    receive configuration information identifying a set of filters for operation on a set of data windows at the plurality of convolution engines;
    determine, using the configuration information, a sequence of convolution operations for evaluation at the multiplication logic;
    in accordance with the determined sequence of convolution operations, request weights and data values for at least partially applying a filter to a data window; and
    cause the multiplication logic to combine the weights with their respective data values;
  and
  accumulation logic configured to accumulate the results of a plurality of combinations performed by the multiplication logic so as to form an output for a convolution operation of the determined sequence.

Each of the plurality of convolution engines may be arranged to independently perform a different sequence of convolution operations such that collectively the convolution engines operate the set of filters on each data window of the set of data windows.

Each of the plurality of convolution engines may be configured to independently request weights and data values for a next convolution operation and cause its multiplication logic to commence that next convolution operation independently of whether or not other convolution engines of the plurality have completed their current convolution operations.

The configuration information may comprise the number of filters in the set of filters and the number of data windows in the set of data windows, and the control logic may be configured to determine a sequence of convolution operations using the configuration information and the number of convolution engines arranged to apply the set of filters to the set of data windows.

The hardware may be arranged to perform a predetermined sequence of convolution operations, each convolution operation being identified by an index according to which each next convolution operation is identified by incrementing the index, and on completing a convolution operation each convolution engine may be configured to determine its next convolution operation by incrementing the index of its current convolution operation by a step value derived from the number of convolution engines such that the sequence of convolution operations performed at each convolution engine is also predetermined.

The step value may be the number of convolution engines.

The set of filters may be arranged to be performed in a fixed sequence over each of the set of data windows so as to form the predetermined sequence of convolution operations, and the control logic may be configured to determine weights and data values for each next convolution operation by determining the filter and data window for that next convolution operation according to the predetermined sequence.

The control logic may be configured to request next weights and data values prior to the multiplication logic completing its combination of current weights and data values.

The configuration information may be received at each convolution engine at the start of a hardware pass, the set of filters for application to the set of data windows identified by the configuration information being the complete set of filters and complete set of data windows for evaluation by the plurality of convolution engines of the hardware in that hardware pass.

Each convolution engine may be configured to identify zero weights in the requested weights and, for each weight and its respective data value, cause the multiplication logic to combine the weight with its respective data value only if the weight is non-zero.

Each convolution engine may be further configured to identify zero data values in the requested data values and, for each weight and its respective data value, cause the multiplication logic to combine the data value with its respective weight only if the weight and data value are non-zero.

The hardware may further comprise input data logic for controlling one or more input buffers arranged to store data values for the data windows required by the plurality of convolution engines, the input data logic being configured to respond to the requests for data values from each convolution engines.

In each request for data values, the control logic of each convolution engine may be configured to identify the data window to which the data values relate and the filter to which the weights relate, and the input data logic may be configured to replace that data window with the next data window according to the predetermined sequence of convolution operations when the final convolution engine using that data window requests the final data values of that data window and the final weights of the final filter according to the predetermined sequence of convolution operations.

According to a second aspect there is provided a method for implementing a Deep Neural Network (DNN) having a convolution layer in hardware, the hardware comprising a plurality of convolution engines each operable to perform a convolution operation by applying a filter to a data window, and each filter comprising a set of weights for combination with respective data values of a data window, the method comprising, at each of the plurality of convolution engines:
  receiving configuration information identifying a set of filters for operation on a set of data windows at the plurality of convolution engines;
  determining, using the configuration information, a sequence of convolution operations for evaluation at the convolution engine;
  in accordance with the determined sequence of convolution operations, requesting weights and data values for at least partially applying a filter to a data window;
  for each received weight and its respective data value, multiplying the weights by their respective data values; and
  accumulating the results of a plurality of the multiplying operations so as to form an output for a convolution operation of the determined sequence.

The method may further comprise causing each of the plurality of convolution engines to independently perform a different sequence of convolution operations such that collectively the convolution engines apply the set of filters to each data window of the set of data windows.

The requesting performed by each of the plurality of convolution engines may comprise independently requesting weights and data values for a next convolution operation and commencing multiplication of weights and data values of that next convolution operation independently of whether or not other convolution engines of the plurality have completed their current convolution operations.

The configuration information may comprise the number of filters in the set of filters and the number of data windows in the set of data windows, and the determining may comprise determining a sequence of convolution operations using the configuration information and the number of convolution engines arranged to apply the set of filters to the set of data windows.

The convolution operations may be arranged in a predetermined sequence and each convolution operation is identified by an index according to which each next convolution operation is identified by incrementing the index, and the determining comprises, on the convolution engine completing its convolution operation, determining its next convolution operation by incrementing the index of its current convolution operation by a step value derived from the number of convolution engines such that the sequence of convolution operations performed at each convolution engine is also predetermined.

The step value may be the number of convolution engines.

The set of filters may be arranged to be performed in a fixed sequence over each of the set of data windows so as to form the predetermined sequence of convolution operations, and the determining may comprise determining weights and data values for each next convolution operation by determining the filter and data window for that next convolution operation according to the predetermined sequence.

The requesting next weights and data values may be performed prior to completion of the multiplying of current weights and data values.

The method may further comprise, at each of the plurality of convolution engines, identifying zero weights in the requested weights and, for each weight and its respective data value, the multiplying may comprise multiplying the weight by its respective data value only if the weight is non-zero.

The method may further comprise, at each of the plurality of convolution engines, identifying zero data values in the received data values and, for each weight and its respective data value, the multiplying comprising multiplying the weight by the respective data value only if the weight and data value are both non-zero.

Hardware may be configured to perform any of the methods described herein.

The hardware may be embodied on an integrated circuit. There is provided a method of manufacturing hardware as described herein using an integrated circuit manufacturing system.

There is provided a method of manufacturing, using an integrated circuit manufacturing system, hardware as described herein, the method comprising:
  processing, using a layout processing system, a computer readable description of the graphics processing system so as to generate a circuit layout description of an integrated circuit embodying the hardware; and
  manufacturing, using an integrated circuit generation system, the hardware according to the circuit layout description.

There is provided computer program code for performing any of the methods as described herein. There is provided a non-transitory computer readable storage medium having stored thereon computer readable instructions that, when executed at a computer system, cause the computer system to perform any of the methods as described herein.

There is provided an integrated circuit definition dataset that, when processed in an integrated circuit manufacturing system, configures the integrated circuit manufacturing system to manufacture hardware as described herein.

There is provided a non-transitory computer readable storage medium having stored thereon a computer readable description of hardware as described herein that, when processed in an integrated circuit manufacturing system, causes the integrated circuit manufacturing system to manufacture an integrated circuit embodying the hardware.

There is provided a computer readable storage medium having stored thereon a computer readable description of hardware as described herein which, when processed in an integrated circuit manufacturing system, causes the integrated circuit manufacturing system to:
  process, using a layout processing system, the computer readable description of the hardware so as to generate a circuit layout description of an integrated circuit embodying the hardware; and
  manufacture, using an integrated circuit generation system, the hardware according to the circuit layout description.

There is provided an integrated circuit manufacturing system configured to manufacture hardware as described herein.

There is provided an integrated circuit manufacturing system comprising:
- a non-transitory computer readable storage medium having stored thereon a computer readable description of hardware as described herein;
- a layout processing system configured to process the computer readable description so as to generate a circuit layout description of an integrated circuit embodying the hardware; and
- an integrated circuit generation system configured to manufacture the hardware according to the circuit layout description.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

In the examples provided herein, the invention is described in relation to a Convolutional Neural Network (CNN). A Convolutional Neural Network is a type of Deep Neural Network. It will be appreciated that the invention is not limited to use in a Convolutional Neural Network and may be used in any kind of Deep Neural Network that comprises a convolution layer.

Figure 1:
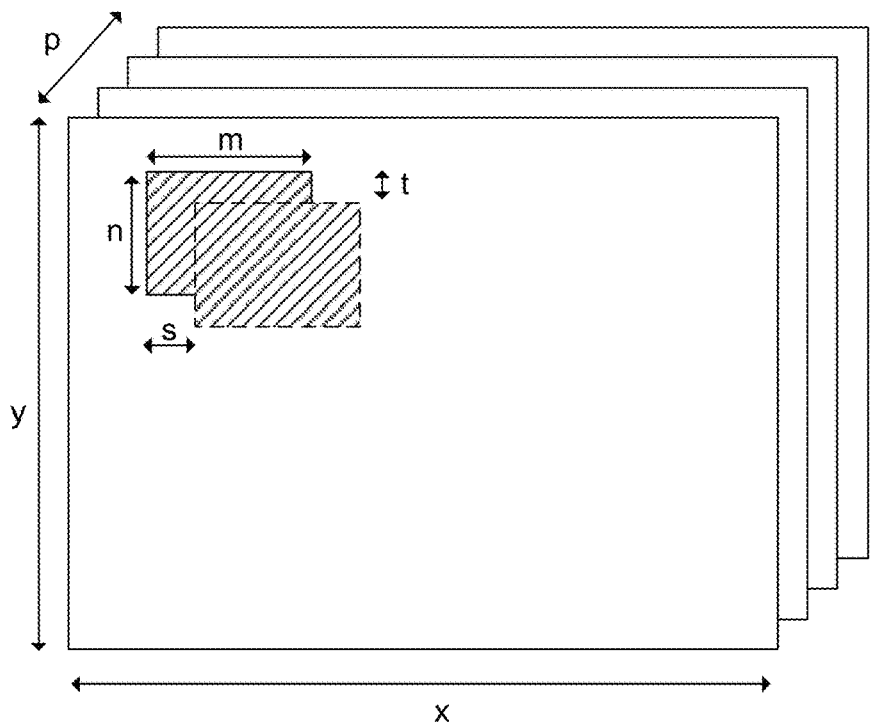
FIG. 1 shows an example of a structure of data used in a Convolutional Neural Network.

An example overview of the format of data utilised in a CNN is illustrated in FIG. 1. As can be seen in FIG. 1, the format of data used in a CNN may be formed of a plurality of planes. The input data may be arranged as P planes of data, where each plane has a dimension x×y. The CNN comprises a plurality of layers each of which has associated therewith a plurality of filters $w_0 \ldots w_n$. The filters $w_0 \ldots w_n$ each have a dimension m×n×P and are be applied to the input data according to a convolution operation across a number of steps in directions and t, as illustrated in FIG. 1.

As mentioned above, each layer may have associated therewith a plurality of filters $w_0 \ldots w_n$. As used herein, the filters may also be referred to as weights, filter weights, or coefficients. A filter may comprise m×n×P weights and a bias value. The number and value of filter weights may vary between layers such that for a first layer, the number of weights may be defined as $w_0^1 \ldots w_{n1}^1$ and for a second layer, the number of weights may be defined as $w_0^2 \ldots w_{n2}^2$, where the number of weights in the first layer is n1 and the number of weights in the second layer is n2.

For a plurality of convolution layers of a CNN, the input data for that layer is processed by convolving the input data for that layer using the weights associated with that layer. For a first layer, the 'input data' can be considered to be the initial input to the CNN, which may in some examples be an image—for example where the CNN is being utilised for vision applications. The first layer processes the input data and generates a first set of intermediate data that is passed to the second layer. The first set of intermediate data may also take the form of a number of planes of data. The first set of intermediate data can be considered to form the input data for the second layer which processes the first intermediate data to produce output data in the form of second intermediate data. Where the CNN contains a third layer, the third layer receives the second intermediate data as input data and processes that data to produce third intermediate data as output data. Therefore reference herein to input data may be interpreted to include reference to input data for any layer. For example, the term input data may refer to intermediate data which is an output of a particular layer and an input to a subsequent layer. This is repeated until the final layer produces output data that can be considered to be the output of the CNN.

Note that a layer of a CNN merely refers to a logical phase of the processing performed in operating a neural network and does not imply that hardware configured to perform the neural network is arranged according to the layer model or that the inputs and outputs of logical layers discussed above are discernible in the flow of data through the hardware.

Hardware Implementation of a CNN

Figure 2:
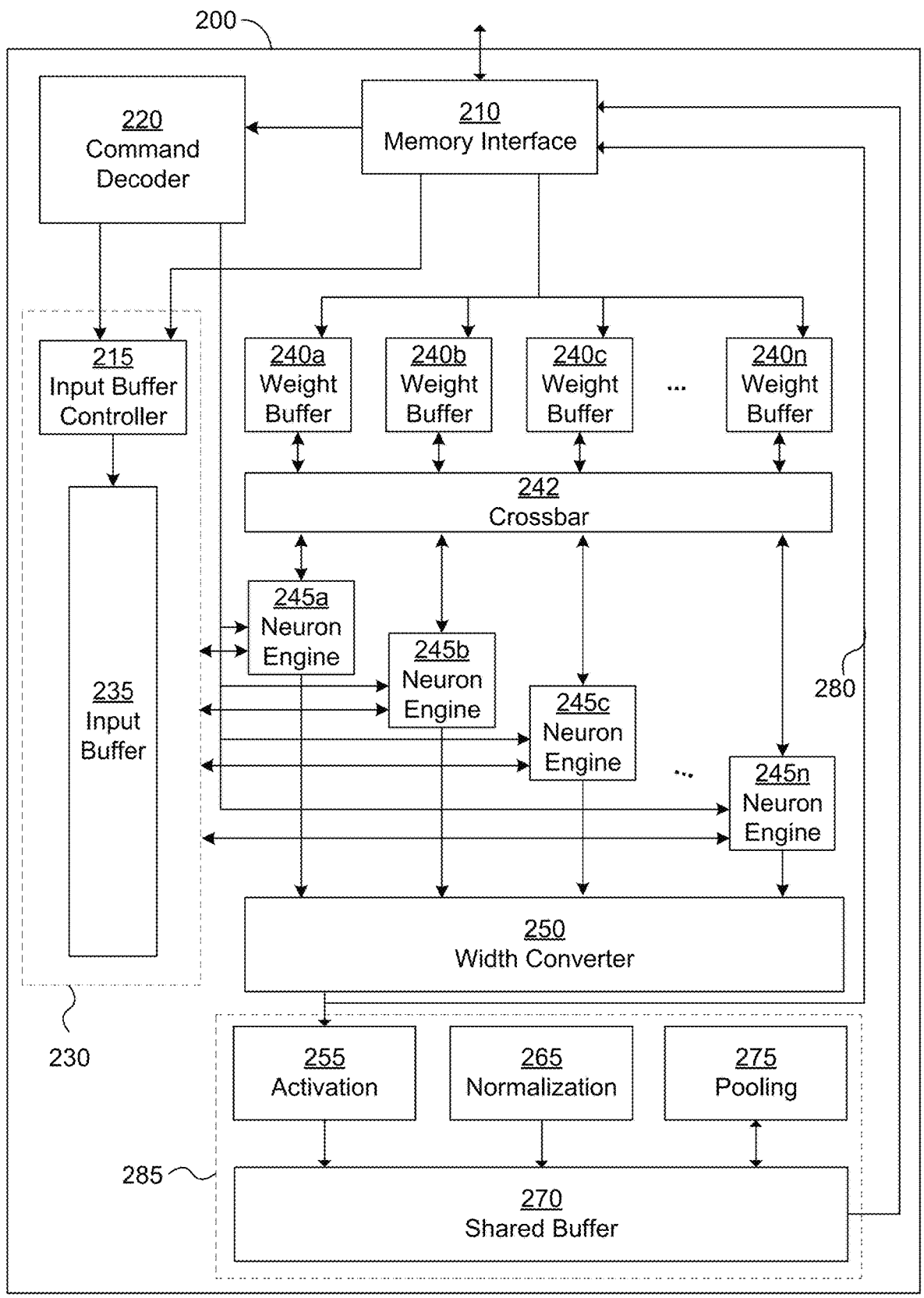
FIG. 2 is a schematic diagram of hardware for implementing a Deep Neural Network.

FIG. 2 illustrates an exemplary hardware implementation 200 configured to implement a CNN. FIG. 2 shows just one example of hardware for use with the present invention: in general, the present invention may be used with any configuration of hardware suitable for implementing a CNN.

The hardware implementation shown in FIG. 2 comprises digital logic circuitry that is configured to receive data that defines the CNN to be implemented and is configured to operate, in accordance with that data definition, to process input data so as to implement the CNN. The hardware implementation may therefore be considered to be configurable hardware for implementing one or more CNNs. In this way, reference herein to a hardware implementation of a CNN is reference to hardware that is configured to implement a CNN by operating on input data in accordance with received configuration data. More generally the hardware may implement a DNN with a convolution layer. The hardware implementation itself is not necessarily configured to implement a specific CNN and is not necessarily pre-loaded with specific configuration data for the CNN. For example, the hardware implementation of the CNN does not need to include pre-loaded (or hard-coded) weight data and layer definitions. The hardware implementation is therefore configured to implement any CNN based on the configuration data it receives. As such, the configuration data (also referred to herein as command data) defines the specific CNN to be implemented, including the number of layers to be included and the size and values of weight data, as well as the expected format of input data.

The data that defines the CNN and how the CNN is to be processed may comprise configuration (or command) data, weight data, and input data. The hardware implementation is therefore configured to process the input data using the weight data in order to perform the operations defined by the CNN. In the example shown in FIG. 2, the hardware implementation 200 comprises a memory interface 210, an input buffer controller 215, a command decoder 220, an input buffer 235, crossbar 242, n weight buffers 240, n neuron engines 245, a width converter 250, an activation module 255, a normalize module 265, a shared buffer 270, and a pool module 275.

The memory interface 210 is configured to provide an interface between the hardware implementation 200 and external memory (not shown). The external memory may be considered as a separate module to the hardware implementation 200 or may be considered to be integrated with the hardware 200. The command or configuration data may, for example, comprise information regarding the size and/or format of the weight data and input data size and format as well as their location in the external memory.

The memory interface 210 is configured to receive, from external memory, weights and data to be used in calculations within the CNN, as well as command information to control the operation of the hardware implementation 200. The received weights (also referred to herein as coefficients) are provided to weight buffers 240 and the received data is passed to the input buffer controller 215. The received commands are passed to the command decoder 220, which, in turn, is configured to decode the commands and subsequently issue control information to elements of the hardware implementation, including the input buffer controller 215 and the neuron engines in order to control the processing of weight and input data.

The input buffer 235 is arranged to provide input data to the neuron engines 245 and the weight buffers 240 are arranged to provide weight data to the neuron engines by means of crossbar 242 which is an example of an interconnect allowing each of the neuron engines 245 to access data in any of the weight buffers. The operation of the weight buffers and neuron engines is described in more detail below.

Completed results from the neuron engines are grouped together by the width converter 250 and provided in sequence to the activation module 255. The activation module is configured to perform an activation function appropriate to the activation layer of the CNN for a given hardware pass. A width converter is an example of convolution output logic which provides the output values from a convolution layer of a DNN.

The activation module 255 may be configured to perform an activation function by means of a lookup table. For example, lookup data representing the activation function may be stored at the lookup table so as to allow at least an approximated value of the activation function to be determined for a received input value by looking the received input value up in the lookup table. Values of the activation function lying between data points stored in the lookup table could, for example, be established by interpolation (e.g. linear or quadratic interpolation) between stored data points or by evaluating stored curve segments representing the activation function over some portion of its total defined range.

In other examples, the activation function may be evaluated directly at suitable hardware logic arranged to perform the activation function.

The hardware implementation 200 may further comprise a normalize module 265 and a pool module 275 configured to share data via shared buffer 270 which receives the output of the activation module 255. The normalize module may be configured to perform one or more normalization functions on the data in the shared buffer. The pool module may be configured to perform one of more pooling functions on the data in the shared buffer—for example, max or mean calculations performed within a sliding window defined for each layer of the CNN.

A result stored in the shared buffer 270 is passed to the memory interface 210, which can either store the result in external memory or pass the result back into the input buffers for further processing without having to first be passed out to external memory.

The shared buffer 270 allows the values output by the activation module to be buffered until the correct samples are available for output and/or to perform normalisation and/or pooling. Used in this way, a shared buffer provides efficiency of storage since, in many implementations, the normalisation and pooling are not combined in the same process. Furthermore, the use of a shared buffer allows the order in which normalisation and pooling is performed to be adapted to the CNN being implemented at the hardware 200. Additionally, by providing shared buffer 270, the activation, normalization and pooling functions may be performed back-to-back without having to retrieve data from external memory.

Sparsity in Convolutional Neural Networks

Weights and input data are frequently zero in CNNs. Weights are often zero as a result of being inserted during a mapping process prior to operating the CNN on the input data. Weight and input data sets comprising a significant number of zeros can be said to be sparse. In the convolutional layer input values are multiplied by their respective weights. Consequently, a significant number of operations in the convolutional layer can result in a zero output. The performance of the system can be improved by skipping (i.e. not performing) these 'multiply by zero' operations.

For example, zero weights may be artificially inserted during the mapping process for the following reasons:

Depthwise Separable Convolutions

The first part of separable filters may only operate on single planes, so if these are mapped as normal convolutions zero weights are inserted for the weights relating to all of the irrelevant input planes.

Atrous Convolutions

Atrous Convolution Operations typically use input values that are spaced out at regular intervals (dilated). When these operations are mapped as normal convolutions zero weights are inserted for the weights relating to the input data values within the window that are not used.

Rounding up to the number of planes packed

When rounding up to the number of planes that are interleaved together in internal memory or the number of planes packed together in the input buffer, zero weights are inserted to correspond to the invalid planes.

Weight quantisation

When quantising the weights to fixed point at a particular bit depth some of the weights can become zero. As the bit depth used for weights reduces the number of zeros introduced by this process increases. This can be thought of as 'implicit pruning'.

Zero Pruning

Zero pruning is a process that can be performed during mapping, where very small non-zero weights can be set to zero in order to increase the sparsity without significantly affecting network accuracy. Significant performance benefits may be gained by performing pruning on weights when a hardware implementation of a CNN is configured to skip multiplications of input data by weights where the weight is zero.

Typically most weight sparsity is artificially introduced into a weight data set.

Sparsity in input data may occur for the following reasons:

Activation Function
Data sparsity is generally higher following a ReLU activation layer, as this function clamps all negative values to zero. Other activation functions such as tan h and sigmoid typically don't increase data sparsity.
Pooling
Data sparsity is generally lower following a Max Pooling or Mean Pooling layer, as these operations reduce the number of zeros present in the data.
Data quantisation
When converting the data into a fixed point format at a particular bit depth, some small values may become zero. The lower the bit depth used, the more zeros are likely to be introduced into the data.
Following filter operations
Where the weights are zero the output of a filter operation will be zero. As a result, input data to a convolution layer which has already been through one or more convolution filters may exhibit high sparsity.

Neuron Engines

It would be advantageous to exploit sparsity in a hardware implementation of a CNN so as to reduce the number of calculations the hardware needs to perform and hence increase its apparent performance or allow a similar level of performance to be achieved with fewer logic elements. A neuron engine approach will now be described with respect to the overview of the hardware implementation of a CNN provided above and described with respect to FIG. 2. A neuron engine described herein is an example of a convolution engine for performing a convolution operation by operating weights of a filter on data values of a data window.

Figure 3:
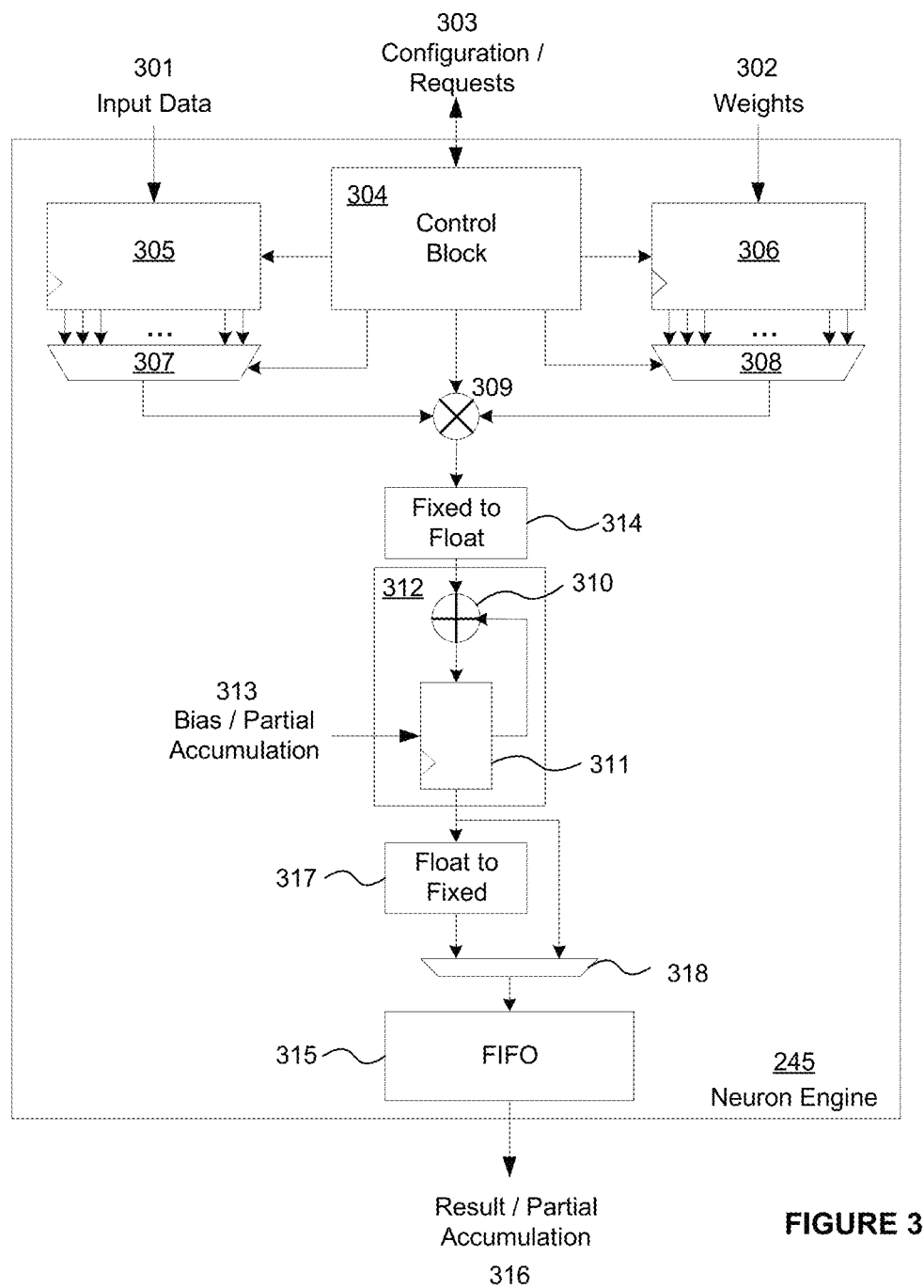
FIG. 3 is a schematic diagram of a neuron engine of the hardware of FIG. 2.

FIG. 3 illustrates a neuron engine 245 as shown in FIG. 2. Each neuron engine 245 may comprise multiplication logic 309 and an accumulator 312, together with a control block 304 configured to select which data and weight elements to operate on based on one or more sparsity maps. The multiplication logic is configured to combine a weight with its respective data value so as to at least partially perform a convolution operation. Such combination comprises multiplying the weight with the data value, optionally with an offset, conversion between number formats, or other operation. The neuron engine selects which data and weight elements to operate on based on at least a sparsity map for the weight data. The neuron engine may further select which data and weight elements to operate on based on a sparsity map for the input data. Each neuron engine may perform a single neuron calculation over multiple clock cycles, where a neuron may be defined as the calculations that are required to generate a single output element. A neuron is an example of a convolution operation which comprises operating a filter on a data window. A neuron engine is configured to operate on a single filter and a single convolution window at a time, and may perform 1 multiplication per cycle until that neuron is complete, at which point it generates a single output element. The neuron engine can then start processing another neuron, which may operate on a different filter and/or window.

In some implementations a neural network may comprise a plurality of multipliers and an adder tree arranged to sum the outputs from the multipliers prior to accumulation so as to form a result for the convolution calculation. This can give improved performance per unit area as there are more multipliers for each accumulator, but also adds some complexity in selecting the non-zero values to multiply.

Input data 301 is received into the neuron engine from input buffer 235 and held at input register 305. Weight data 302 is received into the neuron engine from a weight buffer 240 (via crossbar 242) and held at a weight register 306. Control block 304 is configured to control the data and weight data received into the respective registers 305 and 306 by requesting data according to the convolution windows it is to operate on and weights according to the filters it is to perform on those convolution windows. The control block receives configuration information from the command decoder 220 indicating which filters and windows the neuron engine is to operate on. The control block may receive configuration information such as: the number of filters to be performed on a convolution window; the number of weights for each filter (which is the same as the 3D window size); the number of windows to be performed over the plane (which may be derived from the x,y,P dimensions of the data set and the m, n window size, and the s, t step sizes); the size of each window (which is the same as the number of weights for each filter).

In some examples, it can be advantageous if the control block is configured to request its next filter and/or window—for example, on completing a filter operation or concurrently with performing a current filter operation such that the weights of the next filter and/or the data of the next window are available as soon as the neuron engine has completed its current filter operation. In this manner the neuron engine may work through a list of filters and windows at the speed at which it can perform each filter operation on a window. Since the time required to process a given filter/window combination depends on the sparsity of the weight and input data (see below), this enables different neuron engines to work at their maximal rates without having to wait for other neuron engines to complete their tasks. Configuring each neuron engine to request its next filter/window combination further avoids the need for a high level scheduler to allocate work to the neuron engines.

When each neuron engine is configured to request work, the particular order in which filters are performed on windows in the convolution layer is under the control of the command decoder 220. The command decoder receives a command stream from memory via memory interface 210. By generating a suitable command stream the order in which the filters and windows are performed for a convolution layer of a CNN may be controlled and hence it is possible to ensure that particular sets of neuron engines operate on related filter/window combinations at similar times such that the results of those calculations are available together at the width converter 250 for processing at the activation module 255. An optimal sequence in which filters are to be performed on windows may be determined prior to use of the CNN—for example through the use of configuration software running at a data processing system at which an instantiation of the hardware implementation is provided.

In other embodiments, rather than the neuron engines requesting work, a scheduler may be provided to push weights and data to neuron engines for processing.

A neuron engine 245 may process a single neuron at a time, where a neuron is defined as a single filter applied to a single window position in the data, and returning a single result value (either the completed accumulation or a partial accumulation where the filter has been split). Each neuron may be identified by an index identifying the particular window and an index identifying the particular filter to be applied to the window—for example, {window_index,filter_index}. The neuron engine receives sets of data 301 and weights 302 relating to a particular neuron and works through these. The size of the registers 305 and 306 may be chosen according to the desired balance between circuit area consumed by each neuron engine, their power consumption, performance etc. For typical applications, the registers 305 and 306 may be of a size which is insufficient to hold a full set of input data defining a window and a full set of corresponding weights for operation on that input data. In such cases a plurality of fetches of input data from the input buffer and weights from a weight buffer will be required in order to process an entire neuron.

Any number of neuron engines can theoretically be included in a hardware implementation 200, allowing the design to be scaled with a fine granularity. Furthermore, unlike other monolithic hardware implementations of CNNs, adding more calculation units (the neuron engines) does not decrease the utilisation of calculation units so the design can potentially be scaled to a larger size without incurring efficiency penalties. The throughput of the activation module 255, normalization module 265 and pooling module 275 can be scaled independently from the number of neuron engines.

Sparsity Maps

The control block 304 may be configured to identify whether each input datum or its respective weight are zero. If either the input datum or its respective weight are zero, the datum-weight pair is skipped and not processed. The next non-zero operation may instead be performed on the same cycle. This can be achieved through the use of multiplexers 307 and 308 which are configured to pass to the multiplication logic 309 (in this case a multiplier) only on those datum-weight pairs where both the datum and weight are non-zero. If the sparsity is high many of the operations may be skipped, and the total number of cycles taken to process the neuron may be much reduced.

The control block may be configured to identify whether each datum-weight pair includes a zero value by means of sparsity maps provided for the input data and/or weights. A sparsity map may be a binary string indicating which values (e.g. input values or weights) are zero in an ordered sequence of input data or weight values provided to a neuron engine. In a sparsity map there may be one bit for each respective data element—e.g. an input value or a weight, according to the type of data to which the sparsity map relates. A sparsity map for the input data may be provided with input data 301 by the input buffer 235. A sparsity map for the weights may be provided with weights 302 by a respective weight buffer 240. By combining the pair of sparsity maps the control block may readily determine which of the datum-weight pairs includes a zero value.

In some examples, a sparsity map may be generated at a neuron engine in response to data/weight values being loaded into register 305/306—e.g. zero values in the register may be detected by means of logic at the neuron engine and, responsive to detecting each zero value, set a corresponding bit of a sparsity map representing the position of zeros in the register. In some examples, sparsity maps distinct from the weights/input data are not generated and the control block determines whether each weight/data value is zero from the weights/data values themselves at the point the control provides each weight-data value pair for evaluation at the multiplication logic.

In some implementations, the weights may be provided to the neuron engine in a compressed format with the zeros removed. When weights are provided to a weight buffer in a compressed form this avoids the need to unpack the weights for sparsity. The weight sparsity map may then be used to ensure that each input datum is operated on by the corresponding weight, with the input data sparsity map indicating the next non-zero value pair on which the neuron engine is to operate. The input data is stored uncompressed (i.e. including the zeros) in the register 305. Typically there is no benefit from a buffer size point of view of compressing the data held in the register because (unlike the weights data) the sparsity of the data is not known in advance, so a buffer large enough to store the uncompressed data would need to be provided anyway. Also, this data needs to be random accessed as a 3-D data set, which would be much more difficult to achieve if the data was stored compressed.

Since the weight data for a neural network is known when the network is configured and optimised (typically the weights are generated for the filters on a neural network being trained), a sparsity map for the weight data may be calculated in advance and stored with the weights in memory (see the discussion below of the packing of weight data). Input data is not however known until runtime of the neural network. A sparsity map for the input data may be formed at any suitable point along the data path of the input data to the DNN. For example, an entity running at a data processing system supporting the hardware implementation 200 may be configured to generate sparsity maps for incoming data and store the sparsity maps in memory for subsequent use by the input data module 230. In other examples, sparsity maps for the input data may be generated at the hardware implementation 200—e.g. input buffer controller 215 could be configured to generate sparsity maps on incoming data received for storage at input buffer 235.

The above approach means that the time taken to process each neuron varies depending on the sparsity of the input data and weights for that neuron. Overall, performance is improved and the power consumption reduced by not evaluating zero values held at the registers 305 and 306.

The input buffer controller may be configured to generate the sparsity map for the input data provided to the neuron engines. If the data in external memory is stored in a compressed form, a decompression block may be provided to decompress the data before it is written to input buffer 235. Similarly, an extra compression block may be provided to compress the output data written back to the external memory (e.g. as provided by the width converter or shared buffer for writing out to memory) via memory interface 210.

Figure 7:
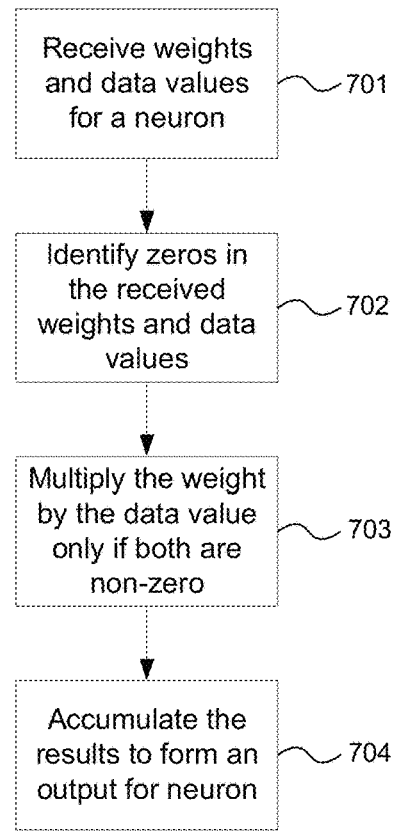
FIG. 7 is a flowchart illustrating exemplary operation of a neuron engine on weights and data values.

A flowchart illustrating the operation of a neuron engine configured to skip multiplication of zero weight or data values is shown in FIG. 7. A neuron engine receives 701 the weights and data values sufficient to at least partially evaluating a neuron. The neuron engine may further receive sparsity data identifying zero weights and/or zero data values. The neuron engine identifies 702 zero weights and, optionally, zero data values in the received weights and data values. The neuron engine is configured to pass a weight and data value pair to the multiplication logic for processing 703 only if the weight and/or data value are non-zero, and optionally only if the weight and data value are both non-zero. In this manner, null operations where one or both of the weight and data value are zero are skipped.

The results of the multiplication operations which are performed are accumulated 704 so as to form an output for the neuron. A given neuron may take multiple passes to evaluate at a neuron engine, with each partial accumulation in respect of a neuron being made available for subsequent processing (e.g. at a future hardware pass). Each pass performed in respect of a given neuron may or may not be at the same neuron engine.

Neuron Allocation

Each neuron engine comprises a control block 304 which is configured to request input data and weight values to multiply and accumulate so as to evaluate a neuron based on the sparsity maps associated with the input data and weights. Each neuron engine may independently work through operating a set of one or more filters on a set of one or more windows so as to evaluate a sequence of neurons. The rate at which each neurone engine progresses through a sequence of neurons is independent of the other neuron engines. Thus the different neuron engines 245 are allowed to run out-of-sync with each other so that each neuron engine can start processing the next neuron immediately after completing the current one, without waiting for the other neuron engines to be at the same point in their processing. Each neuron engine may process a deterministic sequence of neurons.

Each neuron engine may be configured to request its next neuron as soon as it has completed its current neuron, and the command stream provided to the command decoder 220 may be arranged to ensure that neurons are always available for a neuron engine (until the sequence of neurons for that neurone engine/all the neurone engines is exhausted), so as to avoid neuron engines being left idle. Any neuron engine may perform any filter on any window position. Thus the number of filters may be different to the number of neuron engines 245 provided at the hardware 200. This flexible allocation of neurons to neuron engines avoids neuron engines being left idle due to limitations on particular neuron engines being used for particular filters or particular windows.

The control block of each neuron engine may be configured by the command decoder 220—for example, at the start of a hardware pass. The sequence of neurons processed by each neuron engine may be deterministic. The control block of each neuron engine may be configured to determine which neuron to process next. The command decoder may provide to the control block the number of filters to be processed in the hardware pass and the number of windows to be processed in the hardware pass. This information can allow each neuron engine to determine the sequence of neurons it is to process during the hardware pass without receiving further such configuration information from the command decoder. The command decoder may further provide to the control block one or both of: an identifier indicating which neuron engine it is (e.g. NEURON_ENGINE_INDEX); and how many neuron engines there are in the hardware 200 (e.g. NUM_NEURON_ENGINES). However, since both of these values are fixed for the hardware these values could be constants held (e.g. hard-coded) at each neuron engine, in which case the command decoder does not need to provide them.

Figure 5:
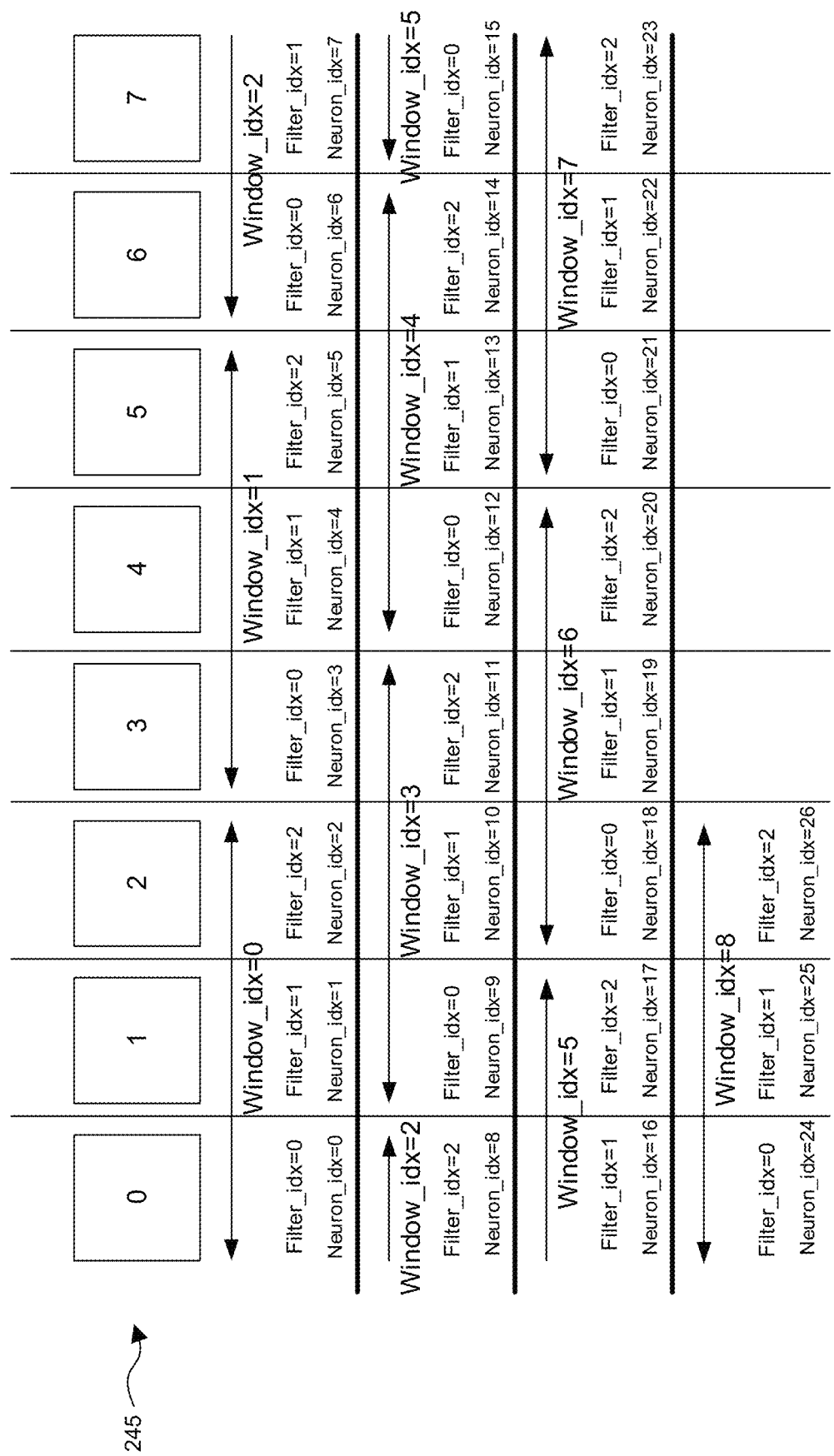
FIG. 5 illustrates a first exemplary allocation of windows and filters to neuron engines.
Figure 6:
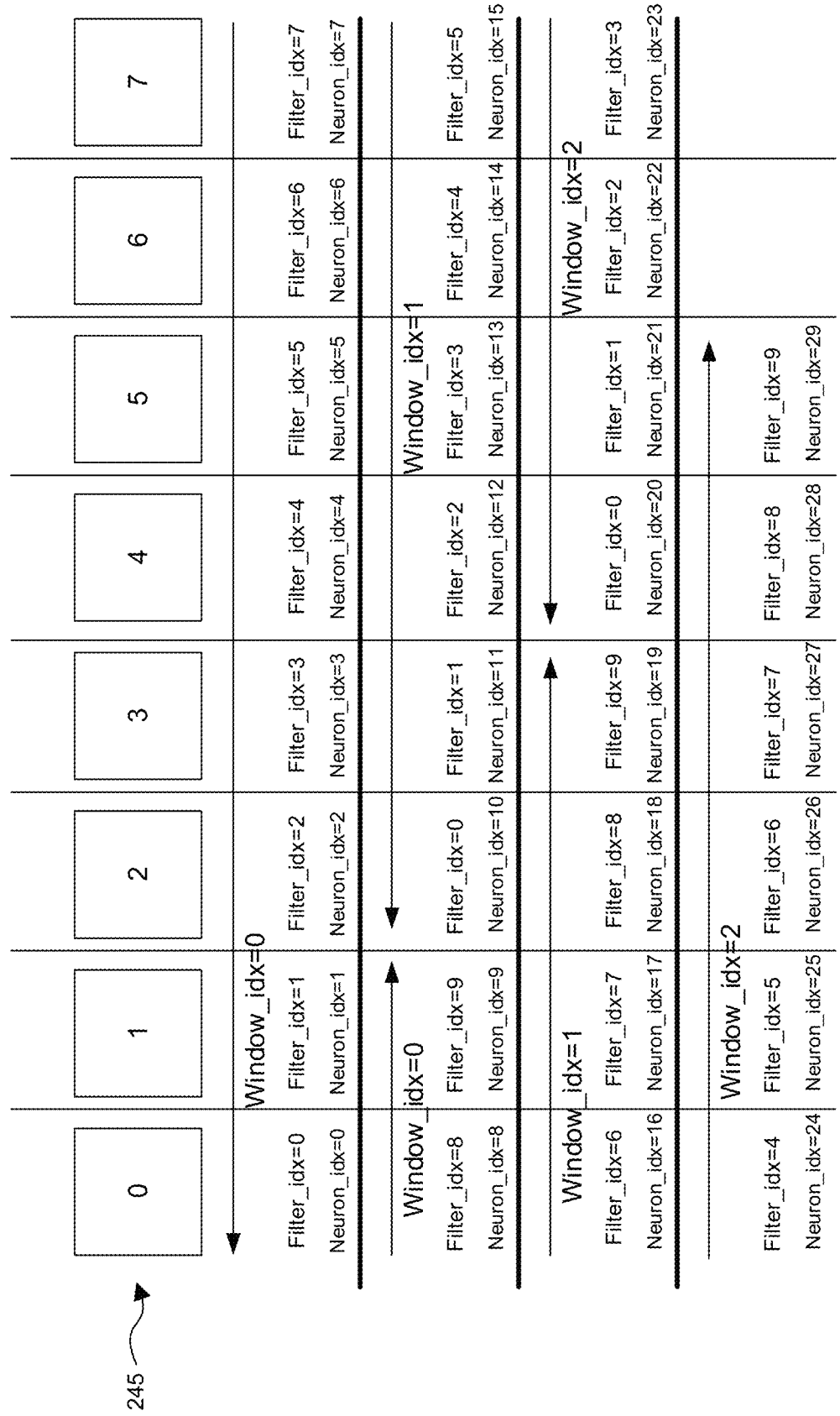
FIG. 6 illustrates a second exemplary allocation of windows and filters to neuron engines.

Neuron engines may be configured to process neurons in a fixed sequence calculated using the configuration data provided by the command decoder (and optionally one or more constants held at the neuron engine). For example, each neuron may be identified by a neuron index which increments over the filters and windows to be processed in a given hardware pass. The neuron index may be incremented over filters first, then over windows, as shown in FIGS. 5 and 6. In one example, at the start of a pass, each neuron requests (or is otherwise provided with) its first neuron for processing. Once each neuron engine has completed processing its neuron, the neuron engine (e.g. its control block 304) may identify the next neuron for processing. For example, using configuration information comprising the number of filters, number of windows and number of neuron engines, a neuron engine could identify its next neuron for processing by adding the number of neuron engines to the neuron index of the neuron it is currently/has just completed processing. Since the neuron engine knows how many filters and windows there are it may then identify the filter and window it requires in order to process that neuron. In this manner, each neuron engine would be configured to process a deterministic sequence of neurons, and the neuron engines collectively can process the total number of neurons available for processing. An arrangement in accordance with this scheme is illustrated in FIGS. 5 and 6. It will be appreciated that many other schemes are possible according to which neuron engines may be configured to request neurons. In some schemes a neuron index may not be used, and a neuron engine may directly identify filters and windows for processing.

Preferably there are no idle multiplier cycles between completing one neuron and starting the next neuron under normal circumstances.

The neurons for a given hardware pass may be formed into a sequence ordered by window position and within each window by filter such that according to the sequence each filter of a given window is performed before moving onto the next window and performing all of its filters in sequence, etc. Neurons (e.g. filter-window pairs) are then allocated to the set of available neuron engines for processing in that sequence.

An individual Neuron Engine may determine the sequence of neurons it should process based on the following information:

NUM_NEURON_ENGINES—constant defining how many neuron engines exist in the hardware;
Num_filters_min1—configurable parameter indicating the number of filters for each window in the pass;
Num_windows_min1—configurable parameter indicating the number of windows in the pass.

An example of an allocation sequence is shown in FIG. 5 for a case where there are fewer filters than Neuron Engines. The configuration parameters provided to the control block are as follows:

NUM_NEURON_ENGINES=8
Num_filters_min1=2
Num_windows_min1=8

In the figure the sequence of neurons processed by each neuron engine 245 is shown in the corresponding column beneath that neuron engine. It can be seen that 26 neurons are processed in the pass, with each of the 9 windows being processed in order and, within for each window, the 3 filters being processed in order.

Note that each neuron engine is allowed to move on to the next neuron in its processing sequence without waiting for the other neuron engines, provided that the first and last window active at any time are not further apart than the maximum number of windows that the input buffer 235 can provide simultaneously.

When the same filter is being used by more than one neuron engine simultaneously, it may be advantageous to constrain the neuron engines to being within a limited number of filter weight words such that the cost of weight unpacking can be shared between the neuron engines (see below). Neuron engines that are using different filters would not have such a restriction and may fall further out of sync.

An example of an allocation sequence is shown in FIG. 6 for a case where there are more filters than neuron engines. The configuration parameters provided to the control block are as follows:

NUM_NEURON_ENGINES=8
Num_filters_min1=9
Num_windows_min1=2

In the figure the sequence of neurons processed by each neuron engine 245 is shown in the corresponding column beneath that neuron engine. It can be seen that 29 neurons are processed in the pass, with each of the 3 windows being processed in order and, within for each window, the 10 filters being processed in order.

In FIGS. 5 and 6, each filter is only used by one neuron engine at a time, but which neuron engine uses which filter varies through the pass.

In order to process a neuron, the control block 304 of a neuron engine requests 303 from the input data module 230 the input data for the window to be processed and (preferably simultaneously) requests the weights for the relevant filter over crossbar 242 from a weight buffer 240. The returned input data 301 and weights 302 are each received along with the corresponding sparsity maps and stored into the respective registers 305 and 306. A bias value may also be received and captured in a register (not shown) for use at the accumulator 312. A bias may be stored for a filter at a weight buffer—e.g. along with weights for the filter to which the bias corresponds. Both filters and windows may be identified using a linear index which is incremented in order to proceed according to the nominal processing order of filters and windows.

Neurons may be allocated to each neuron engine according to a deterministic sequence in which the neuron engine first operates all the filters against a given window before moving onto the next window (e.g. in terms of the filter and window indexes identifying the processing performed by a neuron engine, the neuron engine first increments the filter index until all filters have been performed on a window, before incrementing the window index so as to move onto the next window in the sequence).

At any particular time, a configurable number of one or more data windows may be made available to the neuron engines at the input buffer 235. Each neuron engine selects the input data window that has been allocated to it to use (e.g. using a window index to identify the window in the input buffer 235). Multiple neuron engines may be working on a particular window at the same time. This gives a range of window positions that the various neuron engines may be working on at any time. When the last window is no longer needed by any of the neuron engines the data for that window may be discarded from the input buffer and the data for the next window loaded by the input buffer controller 215.

If a neuron engine gets so far ahead that the window it needs is not available yet it will stall and wait for the other neuron engines to catch up to a point where the next window position becomes available. The sequence of window positions to be evaluated may be arranged to wrap from the end of one row of a plane of input data to the start of the next, avoiding any neuron engines being unused at the edge of the plane (e.g. an image frame). The input buffer controller may be configured to keep track of which filters have been completed for each window. When all filters for a particular window have been requested, that window is no longer required and the associated storage in the input buffer 235 is reallocated to the next window position in the sequence.

The command decoder 220 is configured to provide the configuration data 303 to each neuron engine. The configuration data may be provided to the neuron engines at the start of a hardware pass: such configuration data may indicate some or all of the sequence of filters and windows the neuron engine is to evaluate.

The neurons may be allocated in a fixed deterministic sequence to each neuron engine, or in some embodiments, to defined groups of neuron engines operating on a common sequence of neurons. It is possible for one neuron engine to run ahead of another within its own processing sequence. It is possible that dynamically allocating neurons to neuron engines may give slightly higher performance under some circumstances, but the non-deterministic nature of such behaviour would make arranging the output data in the correct order at the width converter more complicated, and would also make it difficult to simulate the hardware implementation of the CNN because it would be impossible to ensure that a particular neuron engine would process the same neurons in a software simulation as it does in hardware. Another advantage of a deterministic allocation of neurons to be processed by each neuron engine is that each neuron engine can calculate the sequence of neurons that it should process itself, avoiding the need for a central scheduler.

In some examples, a plurality of groups of neuron engines may be provided, each group comprising a plurality of neuron engines configured to operate on a set of neurons. Each group may be arranged to operate on a different set of neurons. Each group may be allocated neurons from its set according to any of the above principles.

Figure 8:
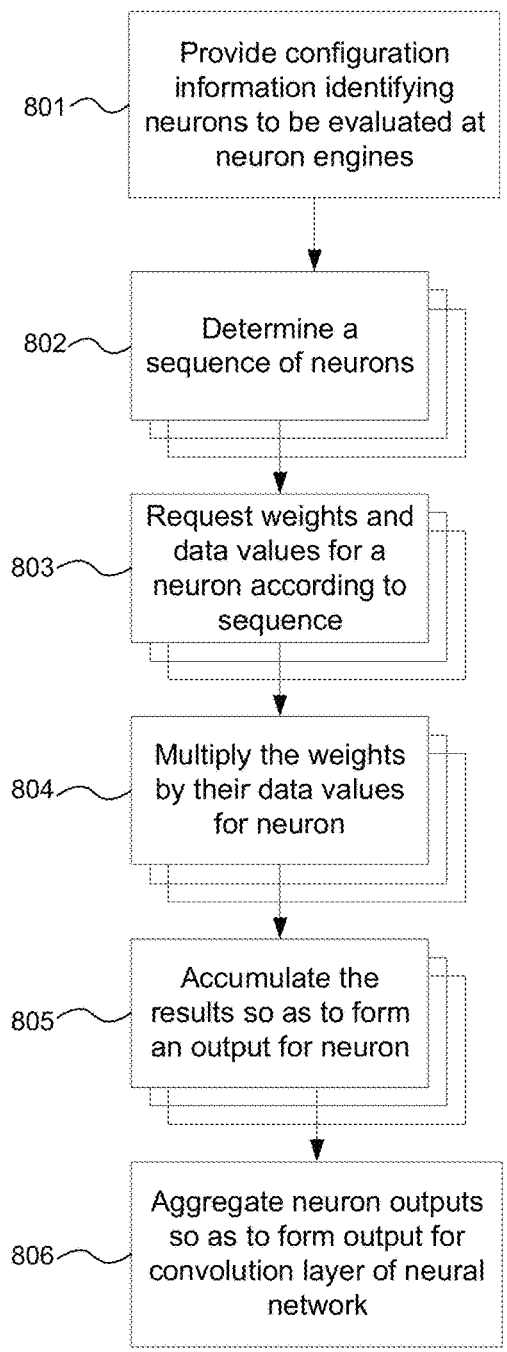
FIG. 8 is a flowchart illustrating exemplary operation of the hardware of FIG. 2.

A flowchart illustrating the operation of the plurality of neuron engines 245 is shown in FIG. 8. Configuration information 801 is provided to the neuron engines which identifies the neurons (i.e. the set of filters and windows) to be evaluated at the hardware. This may be at the start of a hardware pass. Each neuron engine determines the sequence of neurons 802 it is to evaluate using the received configuration information—for example, in a manner described above. The neuron engines then request 803 the weights and data values for each neuron in sequence. Typically a neuron engine will make multiple requests for the weights and data values for each neuron since it will not have capacity at its registers to store all of the weights and data values to evaluate a complete neuron (e.g. perform all of the filters against a window).

A neuron engine will multiply 804 the weights by their data values (optionally skipping any multiplication operations where the weight or data value are zero). The neuron engine then accumulates 805 the multiplication operations so as to form an output for the neuron. A given neuron may take multiple passes to evaluate at a neuron engine, with each partial accumulation in respect of a neuron being made available for subsequent processing (e.g. at a future hardware pass). Each pass performed in respect of a given neuron may or may not be at the same neuron engine.

The final results of the neuron operations performed by each neuron engine are then aggregated 806 (e.g. at width converter 250) so as to form the output of the convolution layer of the neural network for subsequent processing at the back end 285.

Steps 802 to 805 are performed concurrently by the plurality of neuron engines and are therefore each step is shown in FIG. 8 as groups of steps.

Accumulation and Output

Once the input data and weights have been received, data may be pushed through the multiplication logic 309. As has been described, the control block 304 may combine the data sparsity map with the weights sparsity map in order to select the next pair of non-zero data and non-zero weight for multiplication. If the data, the corresponding weight, or both, are zero they are not provided to the multiplier in order to avoid wasting the multiplier cycle by multiplying zero values. On each cycle, the next non-zero data and weight pair are selected. On the first cycle of a new filter the bias value 313 may be added 310 to the multiplier result and stored into the accumulator register 311 (the previous contents of the accumulator relating to the previous filter may be discarded). On all subsequent cycles of the filter the output of the multiplier is added 310 to the current value of the accumulator register 311 and stored back into the register 311.

For accuracy, it can be advantageous to configure the accumulator 312 to operate on floating point values (e.g. 32 bit floating point values). At the same time, to minimise the complexity of other logic and the storage space required by the input data and weights, the multiplication logic 309 of the neuron engine may operate on fixed point values (e.g. 16 bit fixed point values). In this case, the fixed point multiplier result may be converted to floating point 314 prior to the accumulator, and the output of the accumulator 312 may be converted back to fixed point 317 (possibly with a different configurable exponent) prior to being written into the output FIFO 315.

Bias values 313 may be received in floating point format in order to avoid the need for an additional fixed-to-float converter. However it can be advantageous to provide bias values having a shorter floating point bit length (e.g. 16 bits in the case that the accumulator operates at 32 bits). This minimises the bandwidth and memory required for handling the bias values. Converting between floating point values of different bit lengths (e.g. F16 to F32) can be relatively cheap in terms of hardware complexity. For example, it can be advantageous to use custom (e.g. non-IEEE) floating point formats at the neuron engines where the 16 most significant bits of a 32 bit floating point number is arranged to be the same as the 16 bit floating point representation of that same number. This substantially simplifies conversion by avoiding the need for logic to clamp the data on converting to F16 format where the value is outside the representable range.

In other examples, a fixed point accumulator may be used so as to avoid the need for converter units 310 and 314 and (depending on the fixed point bit length used) reduce the area of the neuron engine.

Depending on the size of the registers 305 and 306 relative to the window size and number of filter weights, it may be necessary for a neuron engine to receive input data and weights relating to the processing of a neuron in portions. Increasing the number of values that are requested at a time and buffered locally inside a neuron engine reduces the number of times such fetches need to occur, but increases the size of the registers, multiplexers and the number of connections with the registers.

It is advantageous if, whilst processing a neuron and prior to all the input data or weights stored at the registers 305 and 306 being used by the multiplication logic 309 (or discarded due to sparsity), the control block 304 requests the next sub-set of input data for the current window position or the next sub-set of weights for the current filter. The returned input data and/or weights may be received into the respective registers 305 and/or 306 and processing through the multiplication logic 309 can continue (preferably without the need for any idle cycles). Issuing requests for new data prior to the point in time at which it is needed can minimise interruption to the processing at the neuron engine. The optimal points in time at which the control block of a neuron engine should be configured to request new input data/weights may be calculated at design time—e.g. determined through modelling of the neuron engine circuit.

It is advantageous if a similar approach is taken when switching from one neuron to the next as is taken (as described above) when switching from one data set to the next within the same neuron.

When the calculation of a neuron is completed, the result is written into the output FIFO and processing of the next neuron commences. When the calculation of the last neuron allocated to a particular neuron engine is completed, the control block 304 indicates to the command decoder 220 that it has completed its processing for the hardware pass, and then the neuron engine goes idle.

Weight Buffers

One or more weight buffers 240 may be used to hold the weights for each filter. In the example shown in FIG. 2 there are a plurality of weight buffers equal in number to the number of neuron engines 245. The number of weight buffers 240 may be equal to the number of neuron engines 245 with each weight buffer being configured to provide a set of weights for a filter that is to be performed at one or more neuron engines. In other embodiments other arrangements may be used. For example, there could be fewer weight buffers than there are neuron engines (e.g. a single weight buffer), with the weight buffer(s) being configured to provide weights for one or more filters in operation at the neuron engines—e.g. in response to requests from a neuron engine which identifies the set of weights by a filter index.

Each neuron engine requests the weights from one of the weight buffers depending on which filter has been allocated to it. The neuron engines access the weight buffers by means of crossbar 242. Each neuron engine may address the weight buffer holding the required filter weights using a filter index identifying the set of required weights required to perform the filter. This level of indirection means that a particular neuron engine is not tied to always processing the same filter. It may change between filters for each neuron it processes. This ensures that the neuron engines can all be used even when the number of filters to be performed on a window is not a multiple of the number of neuron engines. It is possible that multiple neuron engines may be working on the same filter at a particular time.

In some implementations where the weight data is compressed, different neuron engines working on the same filter may be restricted to operate on the same portion of the weights of a filter so as to allow only part of the compressed weight data held at a weight buffer to be decompressed at a time for use at a neuron engine. Weights may be unpacked at a weight buffer according to the sequence in which the weights are expected to be required by the neuron engines. A neuron engine that has got too far ahead may be stalled until the one or more other neuron engines catch up. If a neuron engine requests a particular weight after that weight is no longer available unpacked at the weight buffer (such as when it is an entire neuron behind the others in its allocation sequence) the neuron engine may be forced to wait until the other neuron engines have almost completed the filter before it can start.

Figure 4:
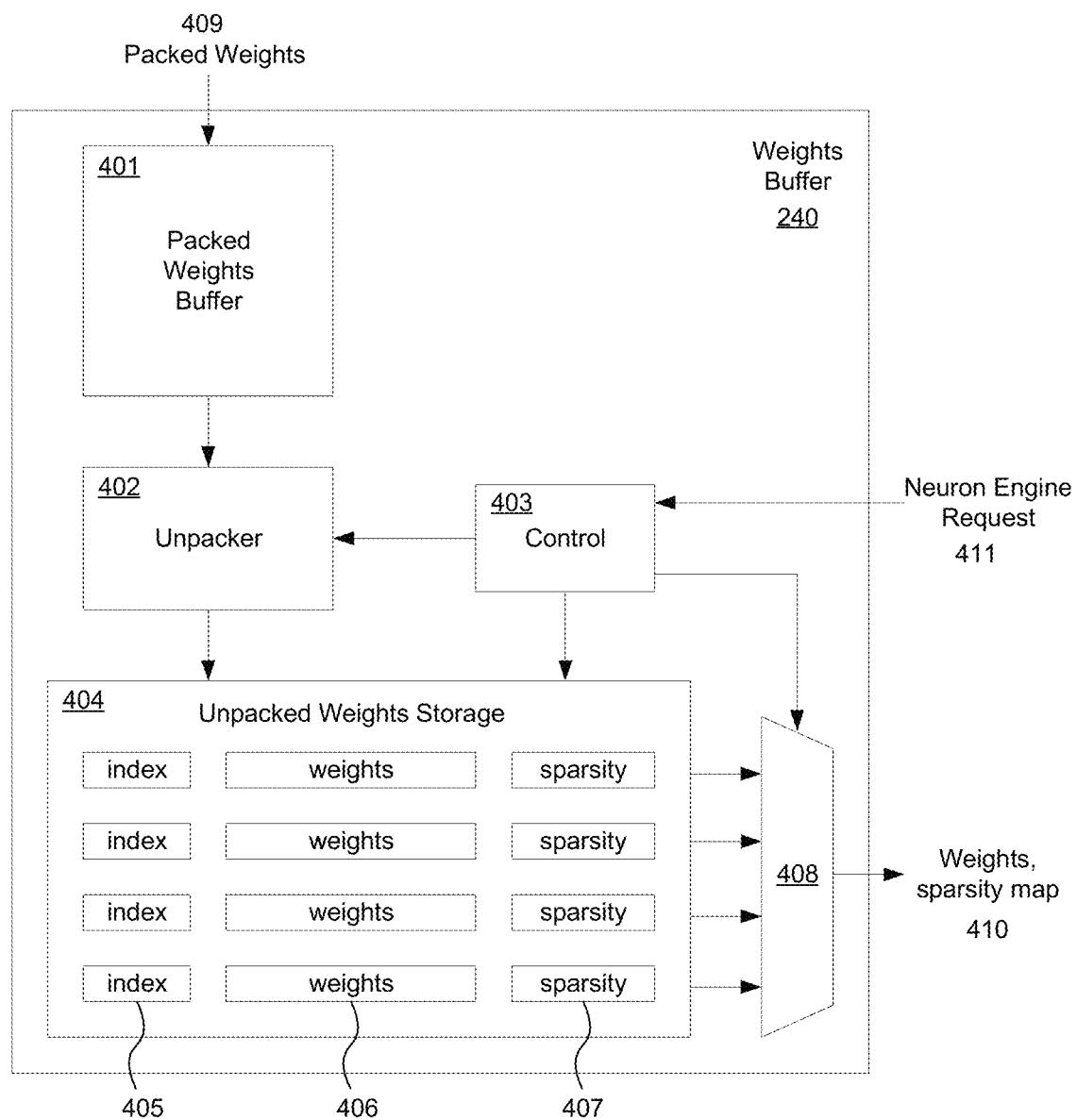
FIG. 4 is a schematic diagram of a weights buffer of the hardware of FIG. 2.

An example of a weight buffer 240 is shown in FIG. 4. A weight buffer stores its weights in a compressed format (e.g. with the zeros removed and with a configurable reduced bit depth) in packed weights buffer 401. The compressed (packed) weights 409 are read in from external memory and stored in the compressed format at a packed weights buffer 401. This reduces the external memory bandwidth, and allows more weights to be stored in a given size of packed weights buffer 401. In order to provide weight data to the neuron engines an unpacker 402 of the weight buffer unpacks the weights into unpacked weight storage 404. Each set of unpacked weights 406 may be referred to as a word (which may or may not be considered to include the corresponding sparsity map 407 and/or index 405). The packed weight data may be only partially unpacked so as to decompress the weight data (e.g. for bit depth) but not for sparsity, i.e. zero value weights are not restored to the correct position in a sequence of weights in a word.

In some implementations, the weights are not unpacked for sparsity, with all of the zero data being grouped together at the end of the weights data 406 instead of being re-inserted in its correct positions. Packing the weights for sparsity with all of the zero weights at one end allows for good compression of the weight data and avoids the need to unpack weights data for sparsity. The weights stored in the packed weights buffer 401 (and held in memory) may be held in the packed form in which the zero weights are together at one end (and potentially further compressed at a reduced bit depth). The unpacked weights data 406 may comprise a plurality of weight values, each corresponding to a bit in the respective sparsity map 407.

A neuron engine may readily use the packed weight data since the sparsity map 407 indicates the position of zero weights in the word. For example, consider an set of packed weights data which comprises 8 weight values (which for simplicity we will represent as integers) and its corresponding sparsity map which is a binary string in which '1' bits indicate a zero weight value:

weights=5, 4, 2, 6, 9, 0, 0, 0
sparsity map=01001100

The weight values may be recreated at their proper positions by reading the non-zero weight values in order to provide the non-zero weights indicated by zeros in the sparsity map, and generating zeros where the sparsity map indicates a '1':

weights in their proper sequence=5, 0, 4, 2, 0, 0, 6, 9

It will be appreciated that many different schemes are possible for representing the positions of zero weights in a set of weight values as a sparsity map.

In some examples, only non-zero weight data is transferred to the registers 306 of a neuron engine along with the respective sparsity map. Zero weights may be inferred from a weights sparsity map received at a neuron engine.

In some examples, the sparsity map 407 and unpacked weights 406 may be combined at so as to arrange the received weight values in their proper sequence at register 306. Such combination could be performed, for example, at a weights buffer 240 or at a neuron engine 245. In such examples, the weight values themselves could be used to identify which weight values are zero, rather than the sparsity map.

Only part of the packed weights may be unpacked at a time. In the example shown in FIG. 4, the four sets of weights 406 are unpacked at a time. In other examples, any number of weight sets may be unpacked as appropriate to the desired balance between immediate availability of weights to neuron engines and the size of the unpacked weights storage 404 for a given hardware implementation 200. The packed weights may be compressed with a configurable bit depth and/or zeros may be removed or represented at the end of the set of weights. Weights may be unpacked for bit depth only but, as described above, zeros need not be restored in sequence.

The weight buffer 240 includes a control block 403 configured to control the sequence of weight unpacking into the unpacked weights storage 404 and to provide access to the weights held at the storage 404 to neuron engines in response to requests 411 from neuron engines. Each set of weights of a filter may be held in a word identifiable by a word index 405. Thus, a neuron engine may request a particular word of a particular filter whose weights are held at one of the weight buffers 240 by issuing over crossbar 242 a request 411 comprising a word index and filter index. In this manner a neuron engine need not itself identify which of the weight buffers holds the weights it requires.

Each set of weights may be stored at the packed weight buffer along with its sparsity map indicating which values of the set of weights are zero. The sparsity map associated with a set of weights may be unpacked with the weights into the unpacked weights storage 404 as unpacked sparsity map 407. The sparsity map 407 may form part of an unpacked word at the storage 404 identified by the word index 405.

On a neuron engine requesting a word of a filter which is in the unpacked storage 404, the requested weights 406 are returned 410 to the neuron engine over the crossbar 242 along with the sparsity map 407 for those weights. The control block 403 which receives the word request from a neuron engine may be configured to control which word is selected for output from the storage 404 by means of multiplexer 408.

As described, the weights for each filter are stored in a separate weight buffer 240 so that each filter can be accessed independently by a neuron engine. When the last word of a filter is used the weight buffer may be configured to immediately loop around to the start of the filter again so that the weights are available for another neuron engine to start the filter. The filters available at the weight buffers may be updated at the start of a hardware pass when a fresh configuration is pushed to the elements of the hardware implementation of the CNN by the command decoder 220.

Any number of weights may be provided together in a word with the respective sparsity map having a number of bits corresponding to the number of weights in the word. The number of weights that may be provided together as a set in a word may be configurable. The number of weights may be 4 or a multiple thereof. The number of weights and number of input data values provided to a neuron engine in a single transfer may be equivalent.

Each filter buffer keeps track of which neuron engines are using the weights of its filter. On a neuron engine submitting a request for the first word of a filter which is present in the unpacked storage 404, the neuron engine may be added by the control block 403 to a list of neuron engines that are using the filter. The neuron engine may identify itself in its request 411. The list could, for example, be maintained at the storage 404 and accessible to the control block 403. As neuron engines request each word of the filter from the unpacked storage, the control block may be configured to replace a word in the unpacked storage with the next word comprising the next weight of the filter only once all of the neuron engines on the list have requested that word.

When a neuron engine requests the last word of a filter, that neuron engine may be removed from the list of neuron engines using that filter. In order to avoid blocking requests from other neuron engines for the same filter, if a neuron engine requests the first word (or optionally any other word) of a filter after the first word has already been replaced in the unpacked storage it will not immediately be added to the list of active neuron engines and its request will be stored (e.g. at the control block) and deferred until the word is again available in the unpacked storage. At that point a response 410 may be returned to the neuron engine comprising the weight and sparsity map of the requested filter word.

The operation of the weight buffer as described herein means that when multiple neuron engines begin processing the same filter within the number of words of the filter held at the weight buffer of each other, they can all run in parallel sharing the same filter weights. If one of those neuron engines runs too far ahead it will be stalled until the neuron engine that is furthest behind catches up.

The behaviour of the control block 403 on receiving a new request is summarised in the following pseudocode, where ne_idx is an identifier of a neuron engine:

```
// New request received
If (requested word is in unpacked storage){
    // Return word immediately
    If (word_idx==0){
        // First word of filter requested, so
        // Add ne_idx to active list by setting the
appropriate mask bit
    } else if (word_idx==last){
        // Last word of filter requested, so
        // Remove ne_idx from active list by clearing the
appropriate mask bit
    }
}else{
    // requested word is not in unpacked storage
    // store and defer the request until the word becomes
available, then process as for a new request
}
```

The tracking of which words have been read by a neuron engine on the list of active engines operating with the filter of a weight buffer could be handled as follows:

Maintain at the control block 403 a 1 bit flag for each neuron engine and each word in the unpacked storage, i.e. a number of flags equal to number of neuron engines*number of unpacked words.

When a new word is added to the unpacked storage set all of the flags for that word.

As the word is read by each neuron engine, clear the corresponding bit.

Bitwise AND the flags for the first word currently stored with the mask bits representing the list of active engines. When the result is all zero bits, the word can be retired and replaced with the next word to be unpacked for the filter.

This method has the advantage that, provided there is sufficient register space at the control block, it doesn't put any limit on the number on neuron engines which can be on the active users list.

The number of weight buffers 240 may be equal to the number of neuron engines 245. In some implementations it may be appropriate to provide more neuron engines than weight buffers since multiple neuron engines may in some applications typically be applying the same filters.

When the layers are fully connected, the weights may be streamed in from external memory constantly. Once an initial request for weight data has been sent, the weight buffer may be configured to provide a stream of weights and the respective sparsity maps, with each weight being used only once. The weights may be read in a filter interleaved order in order to allow multiple neuron engines to run simultaneously. For fully connected layers there is typically no benefit of having more neuron engines than filter buffers, since only one neuron engine can read from each filter buffer. If there are more neuron engines than filter buffers some of the neuron engines will be unused when operating on fully connected layers. However, for a given implementation, the performance is likely to be limited by the external memory read bandwidth for the weights rather than by the compute throughput.

Input Buffer

The input buffer 235 is configured to provide a plurality of convolution windows to the neuron engines. Each neuron engine requests data from this set of windows, indexed by, for example:

Window_idx—an index of the window (e.g. incrementing across rows first then columns through the data plane);

word_idx—an index of the word within the window (e.g. incrementing across the window in a predetermined manner, such as along the P, then x, then y directions).

Window_idx identifies which window store at the input buffer should be read, and word_idx is used to determine which word within that window store should be read. An index of the filter being applied (filter_idx) may also be provided by a neuron engine to the input buffer. This may not be used to identify the window data to return, but may be used for synchronisation as will be described.

A neuron engine requests window data from the input buffer from input data module 230 which comprises the input buffer controller 215 and input buffer 235. A neuron engine may be configured to request equal numbers of weight values and input data values at a time in respect of a given filter-window operation. A neuron engine may make multiple requests for weight and input data values in order to perform an operation of a filter on a window. Typically requests from a neuron engine would go to the input buffer controller 215 which may be configured to cause the requested data to be provided from the input buffer 235. In other examples, the neuron engines may be configured to directly access data in the input buffer 235.

The input buffer controller may maintain a set of flags for each window position that can be provided from the input buffer. Each set of flags may comprise a flag for each filter being operated at a neuron engine in the hardware pass to indicate whether that filter has been completed for that window position. The flags may be maintained as follows:

When a window is first loaded into the input buffer all of the flags may be cleared. When a neuron engine requests the last word from that window, the flag relating to the filter that neuron engine is processing (filter_idx) may be set.

When all of the flags relating to the number of filters being processed in the pass have been set this indicates that the window is no longer needed. That window can be retired and replaced in the input buffer by the next window to be processed.

Windows may be processed according to a predefined order. Typically the next window to be processed may be identified by incrementing the window index. For example, in a data plane to be processed as shown in FIG. 1, windows may be processed in rows with the next window to be processed being to the right of the current window, except if the current window was already the rightmost in the plane, in which case the next window may be the first window on the next row (e.g. below).

The use of flags to determine when the storage for a window can be reused is described by way of example in the following pseudocode:

```
// At start of pass, clear all flags
For W in 0 to NUM_WINDOWS-1 {
    For F in 0 to MAX_FILTERS-1 {
        Flags(W)(F) = '0'
    }
}
// Set a flag when a Neuron Engine requests the last word of a
window
If word_idx == last {
    Flags(window_idx)(filter_idx) = '1'
}
// Mask the flags relating to unused filters
For F in 0 to MAX_FILTERS-1 {
    If F > num_filters_min1 {
        Mask(F) = '1'
    } else {
        Mask(F) = '0'
    }
}
// Reallocate a window storage when all flags are set
For W in 0 to NUM_WINDOWS-1 {
    Masked_flags(W) = Flags(W) OR Mask
    If and_reduce(Masked_flags(W)) == '1' {
        // Window is no longer needed
        // Reuse storage for next window
        // Clear flags for that window
        For F in 0 to MAX_FILTERS-1 {
            Flags(W)(F) = '0'
        }
    }
}
```

Width Converter

Each neuron engine may output one value 316 each time it completes a neuron. That might be a final result or a partial accumulation which is provided back to the memory (e.g. via memory interface 210) for subsequent processing at the neuron engines. The rate at which this occurs varies depending on the sparsity of the data and weights for that neuron, as well as on the dimensions of the filter kernel. The output rate at a particular time for each neuron engine may therefore be different. The values output by the neuron engines will typically need to be put into a defined order prior to further processing (e.g. activation) or output to external memory. It is advantageous to achieve this whilst allowing the individual neuron engines to continue processing at their own rates without being stalled.

Each neuron engine includes a FIFO buffer 315 into which the output of each neuron it processes is stored. The use of a FIFO helps to smooth the data rate and allows different neuron engines within a defined group to complete at different rates. A width converter 250 is configured to read the results from the FIFOs of the neuron engines 245 in predefined sets of neuron engines. The width converter reads the results from the FIFOs of a group in the required order and passes those results on for further processing at the 'back end' according to the CNN (e.g. activation at activation module 255). The size of the sets may depend on the width of the 'back end' pipeline—e.g. the data width received by the activation module 255. There may be 8 neuron engines in each set.

The width converter 250 is configured to wait until all of the neuron engines in a set have a result to be read from their FIFO before reading out the oldest result from each FIFO in the set (some neuron engines may have more than one result in their FIFO). All of the FIFOs of a set of neuron engines may be read simultaneously. Furthermore, it may be necessary to send the outputs from the sets of neuron engines in order such that the outputs of the first set of neuron engines is read first, then the outputs from the second set, etc. Thus, for example, the width converter may need to wait for all of the neuron engines of the first set to have outputs available at their FIFOs before reading out those outputs and moving onto the next set. Combined with the allocation of particular sequences of neurons to each neuron engine, this approach can ensure that the output from the neuron engines is provided to the 'back end' in the correct order.

If the neuron engines get far enough out of sync that the FIFO within one of the neuron engines is full whilst the FIFO within another neuron engine in the same set is empty, the 'full' Neuron Engine is stalled until the 'empty' Neuron Engine completes the neuron it is currently processing. If the output rate of the neuron engines (the 'front end') exceeds the maximum throughput rate of the 'back end' the FIFOs inside the neuron engines will begin to fill and eventually stall.

If the number of neuron engines is not an exact multiple of the number of neuron engine sets then it may be reasonable to include a smaller number of neuron engines in the last set of neuron engines, provided that the 'back end' can handle these gaps in the data. Alternatively, it may be reasonable to restrict the number of neuron engines to be a multiple of the neuron engine set size.

Partial Accumulations

When the size of a filter kernel is larger than can be fitted into a weight buffer it is necessary to split filters so that each filter is processed over more than one pass. In order to allow this, a partial accumulation value from the accumulator 312 may be written out 316 to memory during one pass, and then read back in 313 to initialise the accumulators during a subsequent pass. If the filters need to be split over more than two passes, some of the passes both read in partial accumulations and write out updated partial accumulations in the same pass.

Partial accumulations may be provided to a neuron engine in a similar way to a bias value 313 for the accumulator 312 such that the accumulator 312 initialises with the partial accumulation determined in the previous hardware pass for the filter. This avoids the need for separate logic at the neuron engine to handle biases and partial accumulations. Partial accumulations are an output of a previous hardware pass and so, unlike weights and bias values, are not known in advance when the neural network is created and optimised. Partial accumulations would typically be stored in memory at the end of a previous hardware pass (see data path 280 in FIG. 2 which allows for a partial accumulation to be provided to external memory). A partial accumulation may be provided to a neuron engine by the input data module 230 along with a corresponding set of input data. A partial accumulation may be stored at input buffer 235. More generally, partial accumulations may be stored anywhere at the hardware implementation (including at a weight buffer or a further data buffer or register separate to the weight and input data buffers) and provided to a neuron engine in any suitable manner (including in response to input data, weight or other requests from the neuron engine, or pushed to the neuron engine by another module—e.g. a command decoder).

In contrast, a bias is known in advance since it represents part of the definition of a neural network. It may therefore be convenient to arrange for a bias to be provided to a neuron engine by a weight buffer 240 in response to the neuron engine requesting a set of weights 302. A bias may be stored in memory with the corresponding set of filter weights. A weight buffer may comprise a register (not shown) to receive the bias from memory along with a set of filter weights.

As described above for a bias, if the accumulator operates on floating point values and the multiplier on fixed point values, a partial accumulation may be read in as a floating point value so as to avoid conversion (conversion between floating point bit lengths may be necessary but this may be relatively cheap since it typically involves extending the MSBs of the exponent and the LSBs of the mantissa).

Since it is advantageous to perform accumulation using floating point values at the accumulator 312, it is preferable to preserve partial accumulations in their floating point form. A multiplexer 318 may therefore be provided to select between the floating point and converted fixed point forms of the output from the accumulator 312, with the FIFO 315 being able to hold either fixed point or floating point values of the required bit length. In cases where the floating point format used at the accumulator is longer than the fixed point format used for results stored at the FIFO 315, it can be advantageous if the FIFO is configurable to operate in two modes so that, using the same storage, it can behave either as a FIFO of lesser width (e.g. a 16 bit wide FIFO of a given depth), or as a wider FIFO of lesser depth (e.g. a 32 bit wide FIFO with half the given depth). The mode of the FIFO may be configured between passes (e.g. on switching from a neuron that may be processed in a single pass to one that will take multiple passes, and vice versa).

Partial accumulations formed at a neuron engine may be written to FIFO 315 in the same way as final results for a neuron, and read out over data path 316 in the same way by width converter 250. Partial accumulations should not normally be processed at the 'back end' 285 (activation module, normalization, pooling etc.) and may instead be passed over bypass path 280 to external memory via memory interface 210. On a given hardware pass, a neuron engine will be configured to output all partial accumulations or all final results. The output of a neuron engine may therefore be configured for a hardware pass such that values read from the FIFO 315 are directed over the bypass path 280 or passed onto the 'tack-end' for further processing. For example, command decoder 220 could configure the width converter 250 at the start of each hardware pass so as to direct the output from each neuron engine to the bypass path 280 or 'back end' 285. In other examples, a neuron engine may be configured to cause the width converter to pass partial accumulations to memory over bypass path 280—e.g. by setting a flag to identify partial accumulations. In other examples, the width converter may be configured to identify partial accumulations which are to be directed over path 280 by virtue of those values being floating point values when final results provided to the 'back end' 285 are fixed point values.

Single Plane Filter Support

Depthwise separable convolutions are two part convolutions. The first part (the depthwise part) has small filter kernels operating on 1 plane at a time, e.g. 3×3×1 filter. A different filter operates on each input plane. The second part is a normal convolution operation, just operating over a 1×1 window, but over all input planes, e.g. a 1×1×P convolution.

The hardware implementation 200 described herein would typically be configured to perform multiple filters over multiple planes. In such arrangements, when performing depthwise separable convolutions a significant proportion of the filter weights and input data would comprise zero values. Because the neuron engines can skip over 'multiply by zero' operations, the hardware need not perform the null operations and can generally perform depthwise separable convolutions at high performance.

However, when there is extremely high sparsity (e.g. almost all of the data or weights are zero) the overhead of fetching the next set of data/weights may not be hidden by the non-zero filter operations performed by the neuron engines. An improved approach to performing depthwise separable convolutions using the neuron engine approach set out herein will now be described.

The hardware 200 may be configured in a single plane filter mode in which filters are performed in a window comprising a single plane. In a typical configuration of a convolution filter, each window in the data contains all input planes, and the filter contains the same number of weights as the number of elements in the window of depth P planes. In single plane filter mode each window is instead defined as containing only a single input plane, and (if necessary) separate windows are defined for each input plane. In this case the number of weights in a filter is the same number as the number of elements in the single plane window. This significantly reduces the number of weights that need to be stored and transferred in order to perform a filter on a given window.

In a normal convolution mode, the input buffer 235 provides windows (e.g. (indexed by window_idx) to the neuron engines which contain the data for a configurable window size in the x and y dimensions and over all planes P. This is described as an m×n×P window. The data within each window may be linearized in the P,x,y order since P is typically fast moving compared to x and y. Each neuron may be identified by a filter_idx and a window_idx. As has been described, the input data module 230 may discard a window once all filters have been run over that window.

In single plane filter mode, the input buffer 235 is configured to provide windows which only include a single input plane at a time, but which are still configurable in the x and y dimensions. Such windows may be described as m×n×1 windows. Each plane may be output as a separate window, indexed with a different window_idx. The data within each window may be linearized in the x, y order since x may be fast moving compared to y. The window operated on may be incremented over all P for the same x,y before moving to the next x,y position. Each neuron may still be identified by a filter_idx and a window_idx. However, it is no longer the case that all filters are run over each window before moving onto the next window. Only one filter may be run on each window before it is discarded. The input data module 230 may be configured to discard each window once the filter has been applied—e.g. by checking that the filter has been applied in the manner described above. In other examples, more than one but fewer than all filters may be run on a window before it is discarded.

The above approach saves the overhead of fetching large sets of zero weights and the corresponding input data when there is very high weight sparsity due to having the weights for all but one of the planes set to zero. In the single plane filter mode it is advantageous if the input buffer is configured to maintain a greater number of windows than in the normal convolution mode. This can be readily achieved since the windows are smaller in size due to each being a single plane. Another benefit is that the number of sparsity map bits that need to be read in and stored for the weights is reduced.

This use of a single plane filter mode may be useful when performing any set of convolution operations where each input plane is processed separately, such as depthwise separable convolutions, image downscaling and mean pooling (as an alternative or additionally to performing pooling at pooling module 275.

The hardware of FIGS. 2-4 is shown as comprising a number of functional blocks. This is schematic only and is not intended to define a strict division between different logic elements of such entities. Each functional block may be provided in any suitable manner. It is to be understood that intermediate values described herein as being formed in hardware need not be physically generated by the hardware at any point and may merely represent logical values which conveniently describe the processing performed by the hardware between its input and output.

The hardware described herein may be embodied on an integrated circuit. The hardware described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture hardware configured to perform any of the methods described herein, or to manufacture hardware comprising any apparatus described herein. An integrated circuit definition dataset may be, for example, an integrated circuit description.

There may be provided a method of manufacturing, at an integrated circuit manufacturing system, hardware as described herein. There may be provided an integrated circuit definition dataset that, when processed in an integrated circuit manufacturing system, causes the method of manufacturing hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture hardware will now be described with respect to FIG. 9.

Figure 9:
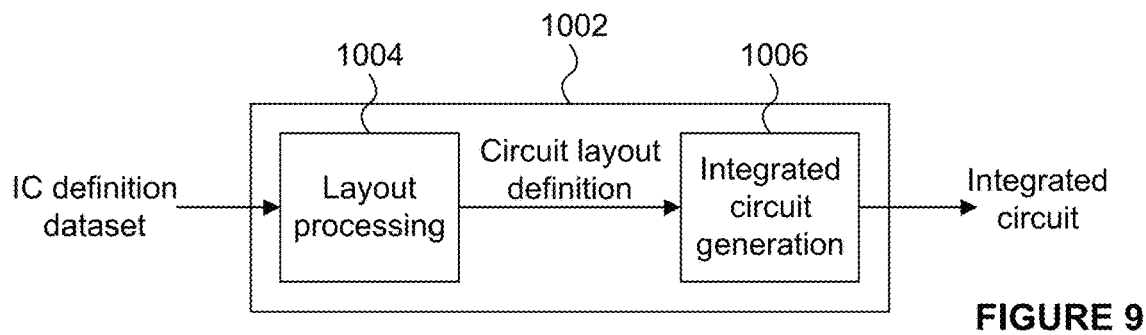
FIG. 9 is a schematic diagram of an integrated circuit manufacturing system.

FIG. 9 shows an example of an integrated circuit (IC) manufacturing system 1002 which is configured to manufacture hardware as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining hardware as described in any of the examples herein), process the IC definition dataset, and generate an IC according to the IC definition dataset (e.g. which embodies hardware as described in any of the examples herein). The processing of the IC definition dataset configures the IC manufacturing system 1002 to manufacture an integrated circuit embodying hardware as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. Hardware for implementing a Deep Neural Network (DNN) having a convolution layer, the hardware comprising a plurality of convolution engines each operable to perform a convolution operation by applying a filter to a data window, each filter comprising a set of weights for combination with respective data values of the data window, and each of the plurality of convolution engines comprising:

multiplication logic operable to combine a filter weight with a respective data window value;

control logic configured to:

receive configuration information identifying a set of filters for operation on a set of data windows at the plurality of convolution engines;

determine, using the configuration information, a sequence of convolution operations for evaluation at the multiplication logic;

in accordance with the determined sequence of convolution operations, request filter weights and data window values for at least partially applying one or more filters of the set of filters to one or more data windows of the set of data windows; and cause the multiplication logic to combine the filter weights with their respective data window values; and accumulation logic configured to accumulate the results of a plurality of combinations performed by the multiplication logic so as to form an output for a convolution operation of the determined sequence.

2. Hardware as claimed in claim 1, wherein each of the plurality of convolution engines is arranged to independently perform a different sequence of convolution operations such that collectively the convolution engines operate the set of filters on each data window of the set of data windows.

3. Hardware as claimed in claim 1, wherein each of the plurality of convolution engines is configured to independently request filter weights and data window values for a next convolution operation and cause its multiplication logic to commence that next convolution operation independently of whether or not other convolution engines of the plurality have completed their current convolution operations.

4. Hardware as claimed in claim 1, wherein the configuration information comprises the number of filters in the set of filters and the number of data windows in the set of data windows, and the control logic is configured to determine a sequence of convolution operations using the configuration information and the number of convolution engines arranged to apply the set of filters to the set of data windows.

5. Hardware as claimed in claim 1, wherein the hardware is arranged to perform a predetermined sequence of convolution operations, each convolution operation being identified by an index according to which each next convolution operation is identified by incrementing the index, and on completing a convolution operation each convolution engine is configured to determine its next convolution operation by incrementing the index of its current convolution operation by a step value derived from the number of convolution engines such that the sequence of convolution operations performed at each convolution engine is also predetermined.

6. Hardware as claimed in claim 5, wherein the step value is the number of convolution engines.

7. Hardware as claimed in claim 5, wherein the set of filters are arranged to be performed in a fixed sequence over each of the set of data windows so as to form the predetermined sequence of convolution operations, and the control logic is configured to determine filter weights and data window values for each next convolution operation by determining the filter and data window for that next convolution operation according to the predetermined sequence.

8. Hardware as claimed in claim 1, wherein the control logic is configured to request next filter weights and data window values prior to the multiplication logic completing its combination of current filter weights and data window values.

9. Hardware as claimed in claim 1, wherein the configuration information is received at each convolution engine at the start of a hardware pass, the set of filters for application to the set of data windows identified by the configuration information being the complete set of filters and complete set of data windows for evaluation by the plurality of convolution engines of the hardware in that hardware pass.

10. Hardware as claimed in claim 1, wherein each convolution engine is configured to identify zero filter weights in the requested filter weights and, for each filter weight and its respective data window value, cause the multiplication logic to combine the filter weight with its respective data window value only if the filter weight is non-zero.

11. Hardware as claimed in claim 10, wherein each convolution engine is further configured to identify zero data window values in the requested data window values and, for each filter weight and its respective data window value, cause the multiplication logic to combine the data window value with its respective filter weight only if the filter weight and data window value are non-zero.

12. Hardware as claimed in claim 1, further comprising input data logic for controlling one or more input buffers arranged to store data window values for the data windows required by the plurality of convolution engines, the input data logic being configured to respond to the requests for data window values from each convolution engines.

13. Hardware as claimed in claim 12, wherein, in each request for data window values, the control logic of each convolution engine is configured to identify the data window to which the data window values relate and the filter to which the filter weights relate, and the input data logic is configured to replace that data window with the next data window according to the predetermined sequence of convolution operations when the final convolution engine using that data window requests the final data window values of that data window and the final filter weights of the final filter according to the predetermined sequence of convolution operations.

14. A method for implementing a Deep Neural Network (DNN) having a convolution layer in hardware, the hardware comprising a plurality of convolution engines each operable to perform a convolution operation by applying a filter to a data window, and each filter comprising a set of weights for combination with respective data values of the data window, the method comprising, at each of the plurality of convolution engines:

receiving configuration information identifying a set of the filters for operation on a set of the data windows at the plurality of convolution engines;

determining, using the configuration information, a sequence of convolution operations for evaluation at the convolution engine;

in accordance with the determined sequence of convolution operations, requesting filter weights and data window values for at least partially applying one or more filters of the set of filters to one or more data windows of the set of data windows;

for each received filter weight and its respective data window value, multiplying the filter weights by their respective data window values; and accumulating the results of a plurality of the multiplying operations so as to form an output for a convolution operation of the determined sequence.

15. A method as claimed in claim 14, further comprising causing each of the plurality of convolution engines to independently perform a different sequence of convolution operations such that collectively the convolution engines apply the set of filters to each data window of the set of data windows.

16. A method as claimed in claim 14, wherein the requesting performed by each of the plurality of convolution engines comprises independently requesting filter weights and data window values for a next convolution operation and commencing multiplication of filter weights and data window values of that next convolution operation independently of whether or not other convolution engines of the plurality have completed their current convolution operations.

17. A method as claimed in claim 14, wherein the configuration information comprises the number of filters in the set of filters and the number of data windows in the set of data windows, and the determining comprises determining a sequence of convolution operations using the configuration information and the number of convolution engines arranged to apply the set of filters to the set of data windows.

18. A method as claimed in claim 14, wherein the convolution operations are arranged in a predetermined sequence and each convolution operation is identified by an index according to which each next convolution operation is identified by incrementing the index, and the determining comprises, on the convolution engine completing its convolution operation, determining its next convolution operation by incrementing the index of its current convolution operation by a step value derived from the number of convolution engines such that the sequence of convolution operations performed at each convolution engine is also predetermined.

19. Hardware as set forth in claim 1, wherein the hardware is embodied on an integrated circuit.

20. A non-transitory computer readable storage medium having stored thereon computer readable instructions that, when executed at a computer system, cause the computer system to perform the a method for implementing a Deep Neural Network (DNN) having a convolution layer in hardware, the hardware comprising a plurality of convolution engines each operable to perform a convolution operation by applying a filter to a data window, and each filter comprising a set of weights for combination with respective data values of the data window, the method comprising, at each of the plurality of convolution engines:

receiving configuration information identifying a set of filters for operation on a set of data windows at the plurality of convolution engines;

determining, using the configuration information, a sequence of convolution operations for evaluation at the convolution engine;

in accordance with the determined sequence of convolution operations, requesting filter weights and data window values for at least partially applying one or more filters of the set of filters to one or more data windows of the set of data windows;

for each received filter weight and its respective data window value, multiplying the filter weights by their respective data window values; and accumulating the results of a plurality of the multiplying operations so as to form an output for a convolution operation of the determined sequence.

* * * * *

UNITED STATES PATENT AND TRADEMARK OFFICE
CERTIFICATE OF CORRECTION

| | | |
|---|---|---|
| PATENT NO. | : 11,551,065 B2 | Page 1 of 1 |
| APPLICATION NO. | : 16/182369 | |
| DATED | : January 10, 2023 | |
| INVENTOR(S) | : Christopher Martin | |

It is certified that error appears in the above-identified patent and that said Letters Patent is hereby corrected as shown below:

In the Specification

Column 6, Line 7:
$w_O{}^1 \ldots w_{n1}{}^1$

Should be:
-- $w_0^1 \ldots w_{n1}^1$ --

Column 6, Line 8:
$w_O{}^2 \ldots w_{n2}{}^2$

Should be:
-- $w_0^2 \ldots w_{n2}^2$ --

Signed and Sealed this
Twentieth Day of May, 2025

Coke Morgan Stewart
*Acting Director of the United States Patent and Trademark Office*